United States Patent [19]

Beyer

[11] 4,029,116

[45] June 14, 1977

[54] GERMINATING TANK FOR GERMINATING AND SOFTENING OF MALT

[76] Inventor: Paul Beyer, Maienstrasse 2, 7057 Nellmersbach, Germany

[22] Filed: Nov. 13, 1975

[21] Appl. No.: 631,704

[30] Foreign Application Priority Data

Nov. 13, 1974 Germany .......................... 2453673

[52] U.S. Cl. ........................ 134/167 R; 134/172; 134/181
[51] Int. Cl.² ..................... B08B 3/02; B08B 9/00
[58] Field of Search ... 134/22 R, 24, 166 R–168 R, 134/171–172, 180–181, 104

[56] References Cited

UNITED STATES PATENTS

| 2,069,574 | 2/1937 | Bowers ................... 134/167 R X |
| 3,324,866 | 6/1967 | Davis ..................... 134/168 R X |
| 3,620,233 | 11/1971 | Busse et al. .............. 134/167 R X |
| 3,953,226 | 4/1976 | Emond et al. ................ 134/104 |

*Primary Examiner*—Robert L. Bleutge

[57] ABSTRACT

A germinating tank for germinating and softening malt supported on a grating. An aerating chamber in the germinating tank below the grating. Spray cleaning nozzles operatively mounted on a carriage which is movable under the grating. The spray cleaning nozzles spray cleaning fluid onto the grating from below and onto the floor of the aerating chamber from above.

15 Claims, 4 Drawing Figures

4,029,116

GERMINATING TANK FOR GERMINATING AND SOFTENING OF MALT

BACKGROUND OF THE INVENTION

The invention relates to a germinating tank for germinating and softening of barley malt supported on a grating. An aerating chamber is located underneath the grating and the arrangement is particularly suitable for malt houses and breweries.

The germinating installations for malt houses and breweries generally include a perforated supporting surface, such as a grating, on which the green and moist malt, such as barley malt, is stored so that moist warm air can be passed therethrough for purposes fo softening the malt material. The air is introduced under pressure into the aerating chamber situated underneath the grating. Due to the deadweight of the softened barley the openings of the grating or perforated surface are often clogged with grain, and this clogging is even more pronounced during the turning of the barley by means of turning members and when the germinating tank is evacuated. Due to this clogging frequently contaminating residual waste material drops below the grating, in particular during removal of the barley from the germinating tank. In order to avoid the excessive formation of bacteria and for other obvious hygienic reasons it is therefore necessary to regularly remove this residual waste material. In the known brewery installations the cleaning operation is carried out by cleaning columns, which clean the germinating tank from above after the chamber has been evacuated. In order to clean the undersurface of the grating it is necessary to construct it out of a plurality of rectangular sections which can be sequentially pivoted upwardly and thereafter sprayed, brushed off and cleaned. Finally, the aerating chamber underneath the grating must be cleaned by removing the residual waste material that has fallen into it. If one considers that the conventional germinating installations have a length of from 30 to 50 meters and a width of from 4 to 5 meters, it can be readily understood that such a cleaning operation requires a man working 6 to 7 hours to complete the cleaning operation. Additionally, it should be noted that such a cleaning operation involves heavy arduous work depending on the height of the germinating chamber.

SUMMARY OF THE INVENTION

It is a general object of this invention to provide a germinating tank which has a cleaning arrangement for carrying out an intensive and automatic cleaning operation of the support grating and the aerating chamber so that the necessity of a manual cleaning operation is eliminated.

The object of this invention is attained by mounting in the aerating chamber an automatic cleaning arrangement which uses a high-pressure medium for cleaning the grating and the aerating chamber. By means of the cleaning arrangement of this invention a satisfactory cleaning operation of the aerating chamber and the support grating can be carried out during a fraction of the time that was heretofore necessary. In a preferred embodiment the germinating tank, which is generally subdivided into a plurality of partial chambers, can have a second cleaning installation operatively mounted in each sub-chamber and the separate cleaning installations are preferably driven by a common drive.

The cleaning installation of this invention has a movable driven support carriage on which there are mounted at least two horizontally extending spray nozzles which are connected to individual or a common pressure source. One of the horizontally extending nozzle pipes serves to spray cleaning fluid upwardly and the other nozzle pipe serves for spraying cleaning fluid downwardly. Such a cleaning arrangement, when installed for example in an aerating space of a germinating chamber, makes possible to clean the underside of the grating as well as the supporting surface by intensive spraying of a cleaning fluid and this cleaning operation is rapid and reliable because the support for the spraying nozzles moves through the germinating tank during the spraying operation. The cleaning liquid which is being sprayed upwardly onto the underside of the grating removes the germinating material and residual matter adhering thereto. Furthermore, the grating is intensively washed and therefore any remaining bacteria are removed. In this manner, the cleaning installation can be operated so that first the grating underside is cleaned and then the floor of the aerating chamber is cleaned. Alternatively both sets of cleaning nozzles may be operated jointly so that, during the traverse of the cleaning arrangement, the cleaning of the aerating chamber is also carried out. It is advantageous to form the spraying nozzles in such a way that the cleaning liquid is also sprayed laterally from the ends of the spraying nozzles so that the walls of the chambers are also sprayed.

A further advantageous feature of the arrangement of this invention resides in that both sets of spraying nozzles are arranged one over the other and the spraying nozzles are disposed in parallel vertical planes in such a way that the cleaning operation of the nozzles which spray the underside of the grating lead the spraying operation of the nozzle spraying the floor of the aerating chamber so that the material that drops from the underside of the grating onto the floor of the aerating chamber is washed out by the spraying nozzles which spray the floor of the aerating chamber.

The arrangement of the invention contemplates that hot as well as cold water is sprayed out of the spraying nozzles or any other suitable cleaning liquid. It is advantageous to provide the cleaning installation with at least one additional special spraying nozzle for spraying a special cleaning fluid and/or disinfectant liquid onto the underside of the grating. A particularly intensive cleaning effect can be obtained when the upper spraying nozzles are pivotable about a vertical drive axis, so that the spray nozzles can carry out an oscillating movement. Preferably the swing axis is situated in the center of the upper spray nozzle pipe, so that during an oscillating movement a circular surface is sprayed and the spray nozzles continuously oscillate.

The cleaning effect can be improved by constructing the upper and lower spray nozzles pipes so that they can absorb high pressure. It is furthermore advantageous to have the lower spraying nozzles mounted in a plane which is below the plane in which the axes of the rollers or casters supporting the carriage for the lower spraying nozzles is situated, so that the length of the spray nozzle pipe can be larger than the width of the support carriage and thereby the entire width of the floor of the chamber can be sprayed with water and the residues can be rinsed out. The rinsing-out operation can be improved by constructing the lower spray nozzles in such a way that they spray the cleaning liquid in a direction in which the rinsing out of the aerating chamber is carried out. The support carriage for the cleaning arrangement can be driven by conventional driving means, such as a motor, which is operatively connected to one pair of the pair of support rollers or casters for the cleaning arrangement. The driving means can also be independent from the support carriage, that is stationary, whereby the support carriage is, for example, connected to the driving motor by means of a chain or cable. In small installations the support carriage can be manually driven, for example by means of a cranked handle.

BRIEF DESCRIPTION OF THE DRAWING

Other objects and advantages will become apparent to those skilled in the art upon careful consideration of the following detailed description, of the invention, taken in conjunction with the accompanying drawing, in which.

DETAILED DESCRIPTION

Figure 1:
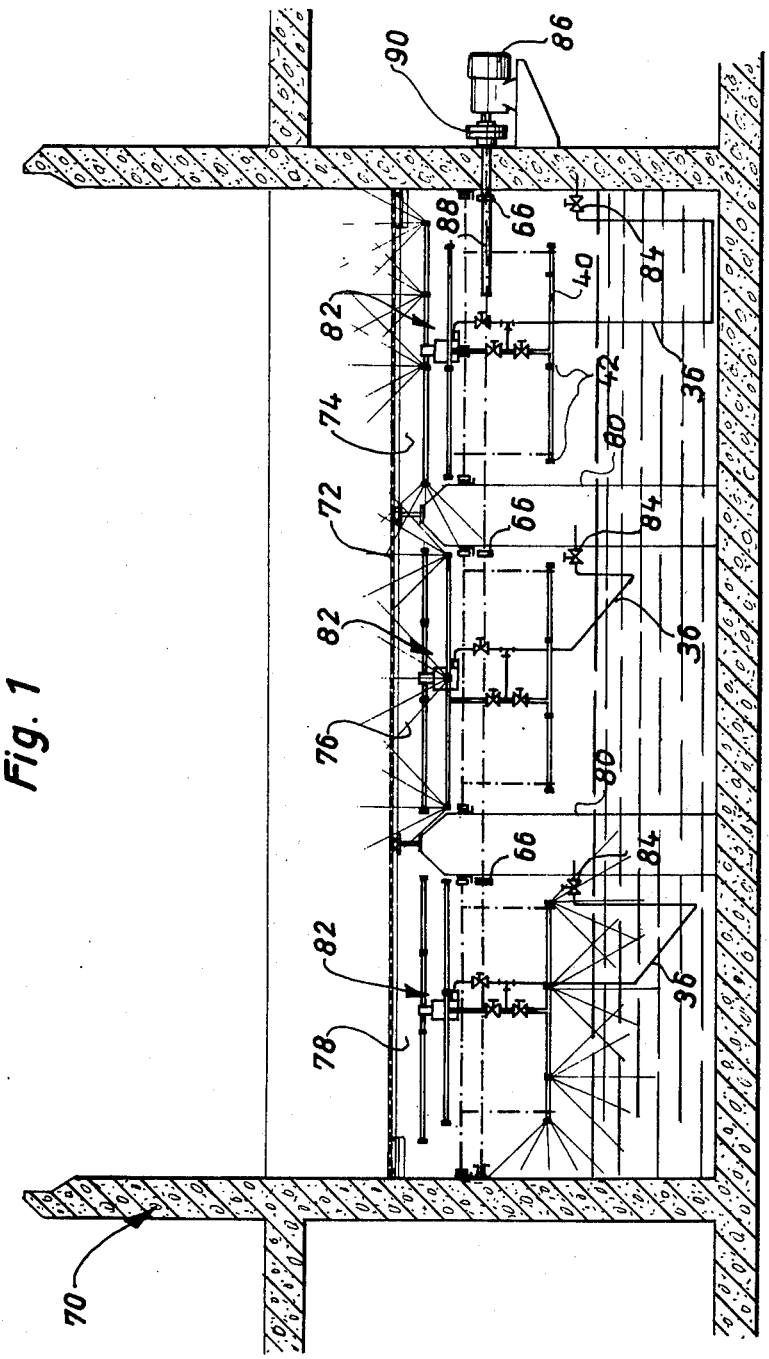
FIG. 1 is a cross-sectional view of a known germinating chamber, the lower portion of which, which is situated below a support grating, constitutes an aerating chamber which is sub-divided into a plurality of partial chambers, in each of which there is mounted a cleaning installation in accordance with the invention.

Referring now to FIG. 1 of the drawing there is illustrated schematically a cross-section of a germinating tank 70, of which the space below a support grating 72 is designated as an aerating chamber. This aerating chamber 72 is sub-divided into a plurality of parallelly extending partial chambers 74, 76, 78 which are separated from each other by support columns 80. A cleaning arrangement in accordance with this invention is arranged in each one of the partial chambers 74, 76, 78 and such cleaning arrangement is adapted to intensively clean the partial chambers in a relatively short period of time. Each cleaning arrangement is designated with the reference numeral 82. Each one of the cleaning arrangements 82 is provided with an inlet valve 84 which is connected to a preferably flexible conduit 36. A cleaning liquid is fed through inlet valve 84 and conduit 36.

Figure 2:
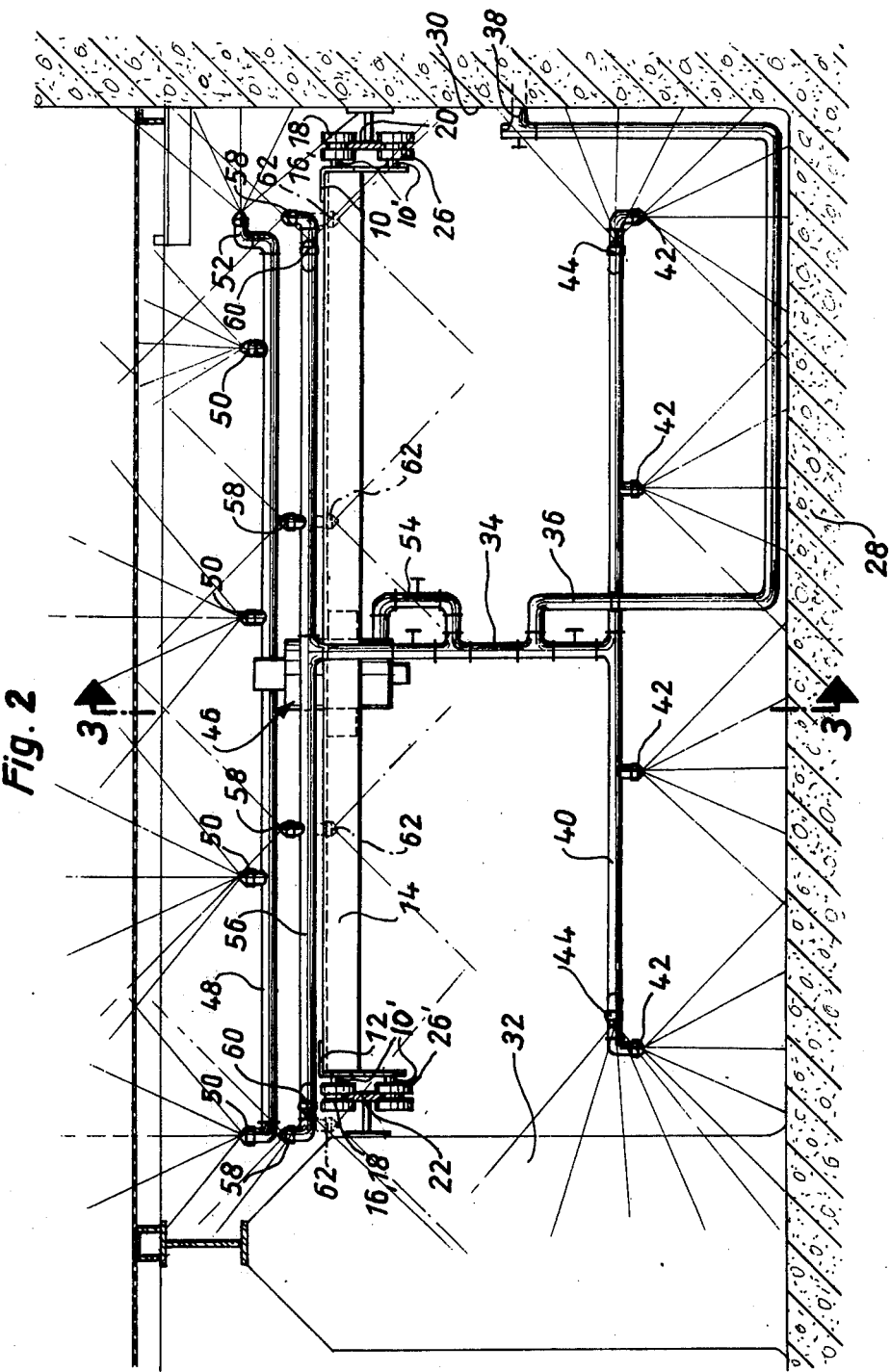
FIG. 2 is a front elevational view of the cleaning arrangement of the invention, which includes longitudinally extending support rails supported along a pair of side walls of a germinating tank and above the floor of such tank, the space below the support rails constituting an aerating chamber.
Figure 3:
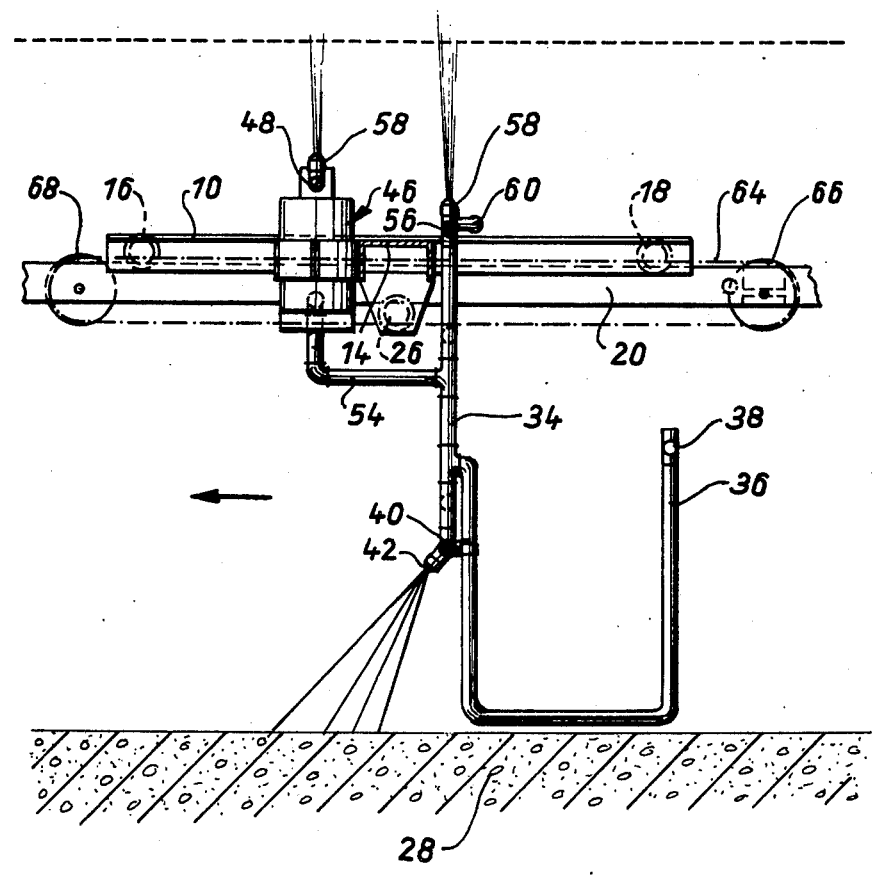
FIG. 3 is a cross-sectional view along a line 3—3 of FIG. 2.
Figure 4:
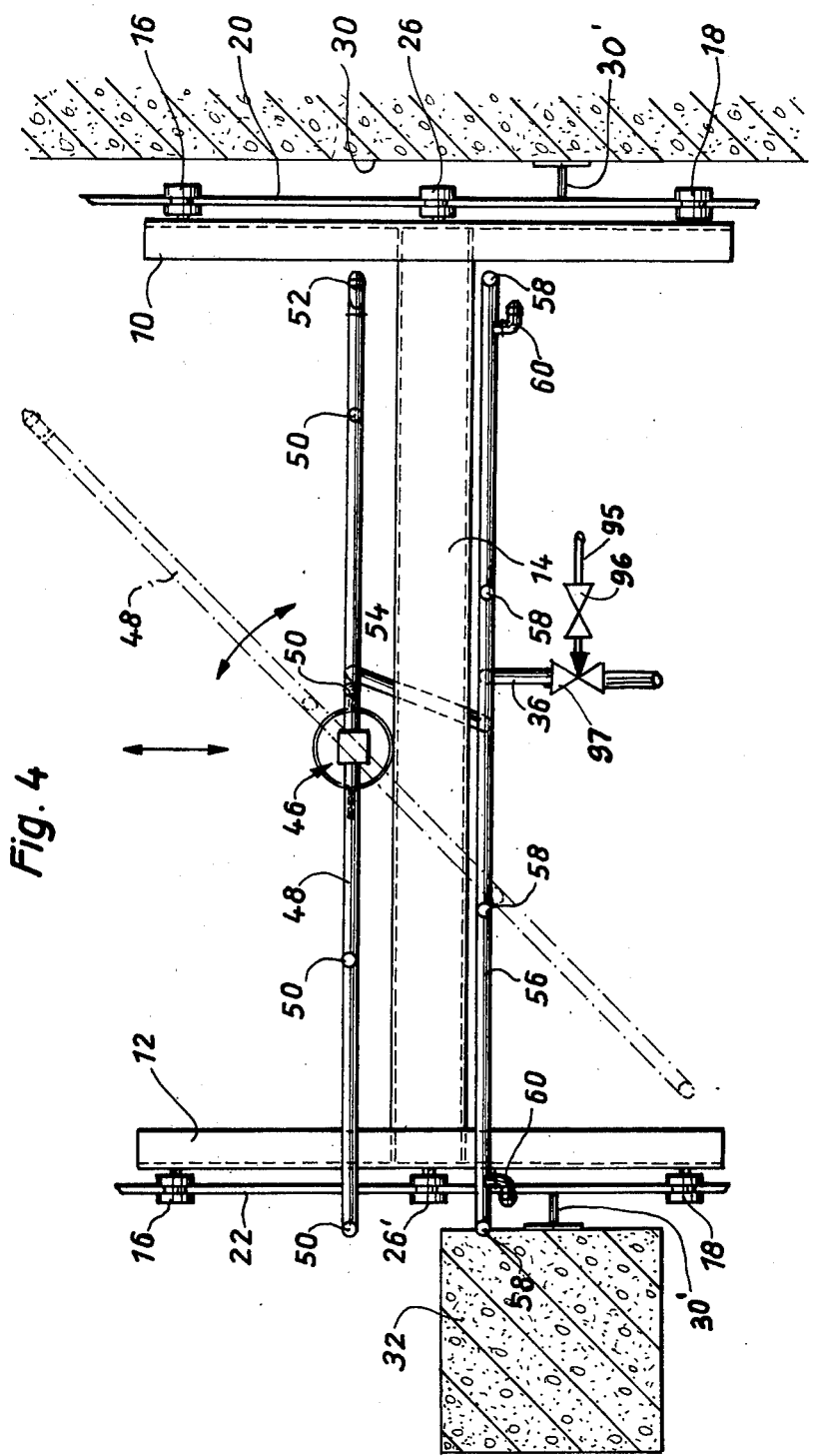
FIG. 4 is a plan view of the cleaning arrangement of the invention.

The cleaning arrangement 82 is illustrated in a greater detail in FIGS. 2–4.

A support carriage comprises a transverse channel member 14 which is rigidly secured at opposite ends to a pair of angle members 10, 12 extending along opposite sides of a partial aerating chamber 74, 76, 78. A plurality of shafts 10' are rigidly secured to the angles 10. Upper rollers 16, 18 are rotatably mounted on the upper shafts 10' and lower rollers 26, 26' are rotatably mounted on the lower shafts 10'. A pair of rails extend along opposite sides of the partial chambers and are respectively secured to the side wall 30 of the germinating chamber and the column 80, 32. The carriage for each cleaning arrangement is therefore securely movably mounted on the longitudinally extending rails 20, 22 by means of the oppositely mounted rollers or casters 16, 18, 26, 26' so that the carriage can not be lifted off the support rails 20, 22. In the arrangement of this invention the to be cleaned space is formed as the aerating chamber of a germinating tank. A pair of support rails is mounted above the aerating chamber, one support rail 20 being supported on the side wall 30 via a T 30' and the other support rail 22 being supported on the column 32 by means of another T 30'. The rollers or casters 16, 18 of the carriage as well as counter rollers 26, 26' are steplessly adjustable in an axial direction so that they can be exactly positioned according to the distance between the support rails 20, 22. In a preferred embodiment of the invention the adjustment of the distance between opposite pairs of support rollers can be effected by changing the length of the traverse channel members 14.

Each cleaning arrangement is constructed as a spray nozzle arrangement by means of which the openings of the support grating can be rinsed clean from the underside thereof as well as the side wall 30, the support column 32 and the floor surface 28 by spraying a cleaning liquid under high pressure from suitable nozzles. The various nozzles of the cleaning arrangement are mounted on the traverse channel member 14. The spraying arrangement includes a vertical supply conduit 34, suspended from the carriage, which is connected via a flexible hose 36 to a supply conduit 38 connected to a pumping chamber. At a suitable distance from the floor surface 28 of the germinating tank there is arranged a first supply pipe 40, rigidly coupled to the supply conduit 34, around the periphery of the leading end of which there are preferably adjustably mounted a plurality of spraying nozzles 42. The spraying angle of the spraying nozzles 42 is selected so that the corresponding spray cones of the spraying nozzles 42 overlap and consequently the entire width of the partial chamber can be sprayed. As can be noted from FIG. 3, the spraying direction of the spray nozzles is directed obliquely downwardly and forwardly so that the residue which collects on the floor surface 28 is pushed to some extent in the direction of the spray cones, that is in the direction indicated by an arrow in FIG. 3, namely, the direction of movement of the carriage. In addition thereto, preferably adjustable spray nozzles 42 are provided at the leading end of the spray pipe 40 which have a spray direction toward the wall 30, respectively the support column 32 and which rinse away any residue material collected thereon. As can be noted from FIGS. 3 and 4 the supply conduit 34 is mounted on one longitudinal side of the transverse channel 14 whereas on the other longitudinal side of the transverse channel 14 there is mounted a rotor 46 approximately in the middle of the length of the channel 14. The rotor axis of the rotor 46 is vertical. There is provided on the rotor axis a second spray pipe 48 which is adapted to spray liquid onto the chamber ceiling, respectively underside of the support grating. Around the periphery of the spray pipe 48 there are also preferably adjustably mounted a plurality of spray nozzles 50 which serve to spray liquid onto the ceiling or underside of the support grating. Furthermore, at the free end of the spray pipe 48 which is opposite to the side wall 30 there is provided a nozzle 52 which serves to spray the side wall 30. The supply of cleaning fluid for the spray pipe is effected by means of a hollow shaft constructed as a rotor shaft which conducts cleaning fluid from the supply conduit 34 via a connecting conduit 54.

The rotor 46 can be constructed so that it utilizes the cleaning fluid simultaneously as a drive medium, that is the rotor shaft either rotates continuously in one direction or permanently alternates its rotary direction, so that the spray pipe 48 is alternately swung back and forth, whereby the washing of the grating surface is particularly effective. A third spray pipe 56 is also provided at its periphery with upwardly directed spray nozzles 58 and the spray pipe 56 is mounted over the upper end of the supply conduit 34. It includes additional spray nozzles 60 which serve to spray the side wall 30, respectively support column 32. The spray pipes 48, 56 have approximately the same length. The spray pipe 56 serves for spraying cleaning and/or disinfecting liquid, whereby the spray pipe 56, as indicated in dashed lines, can additionally have downwardly directed spray nozzles 62 for spraying the ceiling, floor and the side walls with a disinfecting medium. The disinfecting liquid can be supplied to the flexible hose 36 via a flexible hose 95, a valve 96 and a Venturi suction device 97. It is of course understood that the spray nozzles may be constructed with other suitable forms. For example, the spray nozzles may be formed along a line of the pipe in the form of narrow bores so that with their aid a dense liquid layer can be produced. As stated herein-above the cleaning fluid may consist of cold or warm water and may include suitable cleansing agents.

The drive of the carriage is effected by, for example, a chain or cable 64 (see FIG. 3) which may be anchored to one of the support rails, for example support rail 10 or to the transverse channel 14. The cable or chain 64 is guided over idle rollers 66, 68, which may be rotatably supported adjacent to the end walls of the germinating tank. It should be noted that in FIG. 3 the position of the rollers 66, 68 is not exactly illustrated. The rollers 66, 68 are illustrated in FIG. 3 for clarity sake only and not for the purpose of showing the exact positions. As can be noted from FIG. 3 the roller 66 is connected to a drive motor, whereas the roller 68 serves simultaneously for supporting and tensioning the cable or chain 64. Thus with the aid of the driving arrangement as illustrated in FIG. 3, the cleaning arrangement for cleaning the space within a germinating tank which forms the aerating chamber is carried out by guiding the cleaning arrangement from one end of the aerating chamber to the other, whereby at least both spray pipes 40, 48 spray the cleaning liquid under high pressure, for example under a pressure of 50 atmosphere. This high pressure as well as the rotation, respectively to and fro movement of the spray pipe 48 ensure that the underside of the support grating which forms the cover for the aerating chamber, is intensively washed and the residue material which falls from the side wall, respectively support column, onto the floor is rinsed out. The arrangement of the counter rollers 26, 26' prevents that the reactive force that occurs at the spray pipe 40, lifts off the carriage from the support rails 20, 22.

As can be noted from FIG. 1 this type of cleaning arrangement may be driven by a common drive mechanism. Thus, the common drive motor 86 may be coupled to a drive shaft 88 which extends through the entire aerating chamber and which may be connected via a friction coupling 90 to the drive motor. Each cleaning arrangement 82 is provided with a gear coupling 66 which drivingly connects the drive shaft 88 to the cleaning arrangement.

The invention is not limited to the aforedescribed embodiment. Constructive variants of the cleaning installation are intended to be included. For example, the high pressure pipe 48 can be rigidly mounted onto the support carriage. The guiding for the cleaning installation can be provided in the middle of the germinating tank on a suitable support member. The arrangement of the pipes and the pertinent elements depends substantially on the height of the germinating tank.

Although the invention is illustrated and described with reference to a plurality of preferred embodiments thereof, it is to be expressly understood that it is in no way limited by the specific disclosure of such preferred embodiments, but is capable of numerous modifications within the scope of the appended claims.

What is claimed is:

1. A germinating tank for germinating and softening malt supported on a grating, said tank having an aerating chamber situated below the grating, the improvement comprising in combination, spray cleaning means operatively movably mounted in said tank below said grating;

a cleaning fluid high pressure source; and at least partially flexible conduit means connecting said fluid high pressure source to said spray cleaning means; whereby said spray cleaning means is adopted to spray cleaning fluid onto said grating and into said aerating chamber; said spray cleaning means include a carriage movable operatively mounted in said aerating chamber, at least a pair of spray pipes supported on said carriage and being connected to said fluid high pressure source, one of said spray pipes conducting fluid to be sprayed upwardly and the other spray pipe conducting fluid to be sprayed downwardly.

2. The improvement in a germinating tank as set forth in claim 1, wherein said spray pipes are also adapted to spray laterally from their free ends.

3. The improvement in a germinating tank as set forth in claim 1, wherein said spray pipes are parallel relative to each other and are located in one vertical plane one above the other.

4. The improvement in a germinating tank as set forth in claim 3, including an additional spray pipe supported on said carriage for spraying a cleaning and disinfection fluid.

5. The improvement in a germinating tank as set forth in claim 4, wherein said upper and lower spray pipes are formed as high pressure pipes.

6. The improvement in a germinating tank as set forth in claim 3, wherein the upper one of said spray pipe is swingably mounted about a vertical axis.

7. The improvement in a germinating tank as set forth in claim 6, wherein said vertical axis is located substantially in the middle of the length of said upper spray pipe.

8. The improvement in a germinating tank as set forth in claim 3, wherein the lower spray pipe sprays the cleaning fluid in the same direction as the direction of movement of said carriage.

9. The improvement in a germinating tank as set forth in claim 3, wherein said carriage is supported on rollers and said lower spray pipe is located substantially below the plane containing the axes of said rollers.

10. The improvement in a germinating tank as set forth in claim 1, wherein said carriage is supported at each side by at least a pair of rollers, a pair of rails mounted in said germinating tank, said carriage being supported on said rails via said pairs of rollers, a pair of idle rollers associated with at least one rail, a drive motor, a chain connected to said carriage and said drive motor, and guided around said pair of idle rollers, whereby said carriage is moved by said drive over said pair of rails via said chain.

11. The improvement in a germinating tank as set forth in claim 10, and including a counter roller mounted on the opposite side of each rail with respect to the side on which said roller supporting the carriage is mounted, said counter-rollers also operatively supporting said carriage on said pair of rails.

12. The improvement in a germinating tank as set forth in claim 10, wherein the distance between rollers disposed on opposite sides of said carriage is adjustable.

13. The improvement in a germinating tank as set forth in claim 1, wherein said spray pipes have a plurality of spray nozzles adjustably mounted thereon.

14. A germinating tank for germinating and softening malt supported on a grating, said tank having a aerating chamber situated below the grating, the improvement comprising in combination,
    a cleaning fluid high pressure source; said aerating chamber is divided into a plurality of sub-chambers;
    separate horizontal spray cleaning means operatively movably mounted in each sub-chamber below said grating in said tank, and
    common drive means operatively connected to said separate spray cleaning means for operatively driving each spray cleaning means in the corresponding sub-chamber;
    at least partially flexible conduit means connecting said fluid high pressure source to said spray cleaning means; whereby said spray cleaning means is adopted to spray cleaning fluid onto said grating and into said sub-chamber.

15. The improvement in a germinating tank as set forth in claim 14, wherein said common drive means includes a common drive shaft, a common drive motor, and a clutch operatively connecting the drive shaft to the drive motor, each separate spray cleaning means comprising gear means operatively connected to said common drive shaft.

* * * * *